July 3, 1928.
W. S. PIERCE, JR
1,675,728
ANTIFRICTION BEARING
Filed Dec. 17, 1925
3 Sheets-Sheet 1
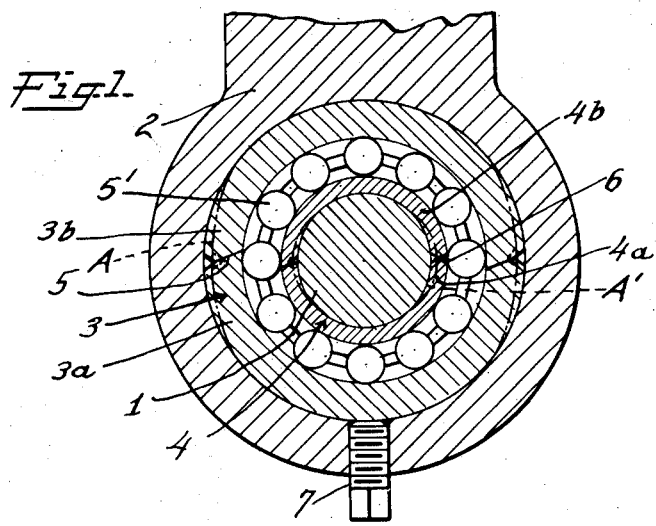
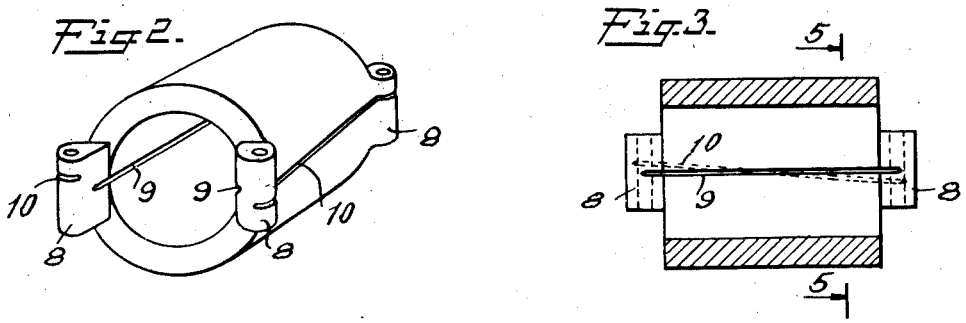
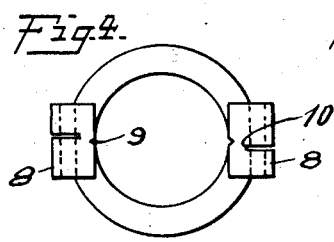 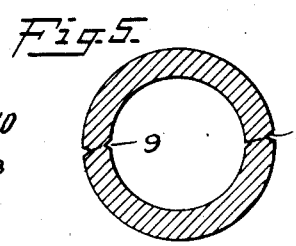 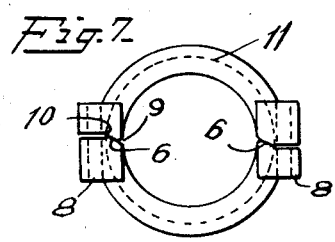
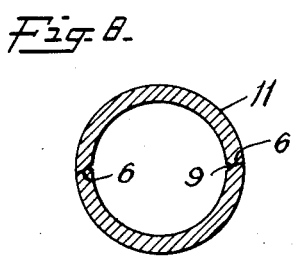 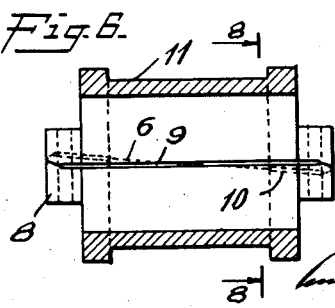
INVENTOR
Winslow S. Pierce Jr.
BY
ATTORNEYS

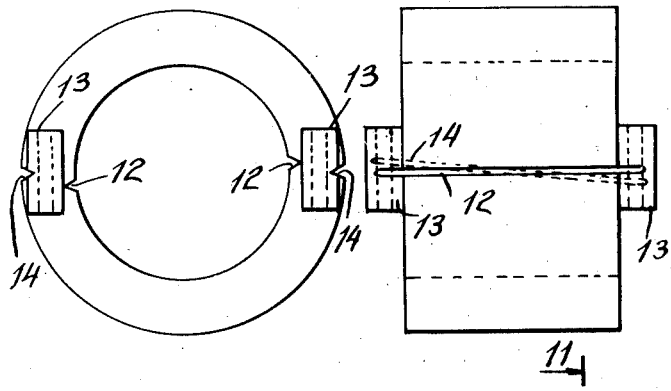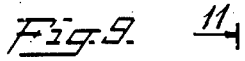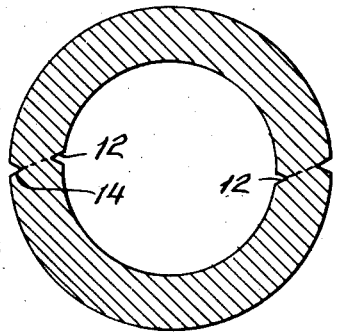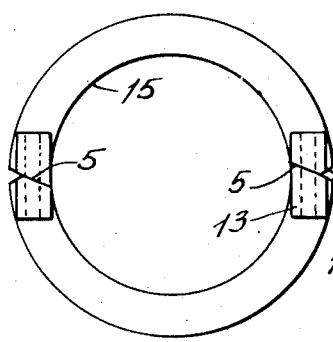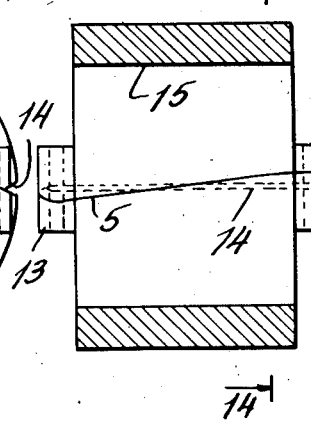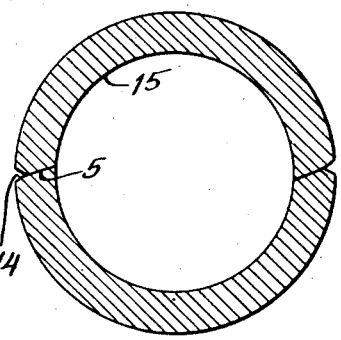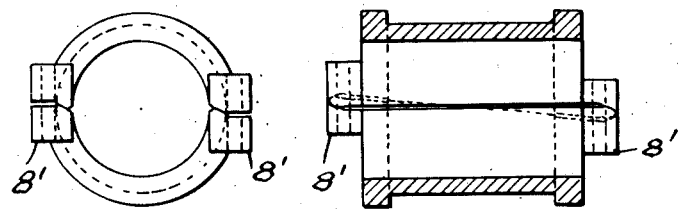

July 3, 1928.

W. S. PIERCE, JR 1,675,728

ANTIFRICTION BEARING

Filed Dec. 17, 1925    3 Sheets-Sheet 3

INVENTOR
Winslow S. Pierce Jr.
BY
ATTORNEYS

Patented July 3, 1928.

1,675,728

UNITED STATES PATENT OFFICE.

WINSLOW S. PIERCE, JR., OF BAYVILLE, NEW YORK.

ANTIFRICTION BEARING.

Application filed December 17, 1925. Serial No. 76,006.

My invention relates to anti-friction bearings and particularly to the production of bearing races. My invention is particularly useful in making bearings having bearing races made in two parts so that the races can be readily assembled on a shaft of such a character that a solid cylindrical race cannot be slipped over the end of the shaft. My invention includes an improved method of making bearing races, as well as the improved bearing race itself and the bearing made by employing one or more of the improved bearing races.

In my Patent No. 1,498,784, I have disclosed and claimed an invention particularly useful in making radial ball bearings having two part bearing races. The invention set forth in this patent may, of course, be used to advantage in the production of bearings of the roller type but it is perhaps not so well suited to this purpose as the present invention which was devised primarily with a view to overcoming certain difficulties ordinarily encountered in making roller bearings having bearing races each consisting of two parts.

The usual practice in making split bearings is to construct the journals so that the line of separation between the two parts is parallel to the axis of the race. Where this construction is employed in the races of roller bearings, it is possible for the rollers to make contact with the joint throughout the entire length thereof when the rollers pass over the joint. In order that excessive wear in the immediate vicinity of the joint may be avoided, it is desirable to have the exposed edges of the joint extend at an angle to the axis of any roller passing over the joint.

The present invention was devised mainly with a view to providing a split bearing race the two parts of which contact with each other across a broken surface, the race being constructed so that the exposed edge of the joint extends at an angle to the line of contact between any roller and the bearing race. This result could be brought about by breaking the race along a curved surface extending in the form of a spiral about the axis of the race. If both the inner and outer edges of the broken surface were made in spiral form, some difficulty would be encountered in assembling an inner race on the bearing shaft. It would be necessary to use considerable force in applying the two parts of the race to the shaft and this might result in distorting the two sections of the bearing race so that the broken surfaces would not fit together to provide a perfectly smooth surface at the joint.

In order to avoid the above mentioned difficulty, I prefer to construct the bearing so that the inner race, at least, is provided with broken surfaces such that the inner edges of these surfaces are substantially parallel to the axis of the bearing shaft, although the outer edges may extend at an angle thereto. In general, this can be accomplished by scoring the inner face of the cylinder which is to form the inner bearings race, with grooves extending parallel with the axis of the race, and scoring the outer surface of the cylinder with corresponding grooves extending in spiral form or in some other form so as to provide a joint extending at an angle to the line of contact between the race and any one of the rollers. After the cylinder has been scored in this manner, it can be broken and then assembled on a shaft without employing any force which might distort the bearing sections and render them unfit for their intended purpose.

In general, my improved method of breaking a bearing cylinder to form a two-part race, consists in applying force to the inner surface of the cylinder so as to develop sufficient tensile stress in the cylinder wall in the grooved portions thereof to break the cylinder. The force should be applied to the inner surface of the cylinder throughout substantially the entire area of this surface. This can be done by subjecting the cylinder to the action of a suitable fluid under pressure. Another method is to fill the cylinder with a soft metal such as lead and then apply sufficient pressure to this soft metal to break the cylinder. My preferred method of breaking the cylinder is to employ an expansion device such as that hereinafter described. In general, this device comprises two members having external cylindrical surfaces closely fitting the inside of the bearing cylinder, and a third member which can be forced between the other two until the bearing cylinder breaks.

My invention can be best understood by considering the following detailed description, which is to be taken in conjunction with the accompanying drawings in which—

Figure 1 is a vertical section view of a roller bearing made in accordance with the invention.

Figure 2 is a perspective view of a bearing cylinder showing one stage in the production of one embodiment of my improved bearing race.

Figure 3 is a longitudinal section view of the cylinder shown in Figure 2.

Figure 4 is an end view of the cylinder shown in Figure 2.

Figure 5 is a transverse section view taken on line 5—5 of Figure 3.

Figure 6 is a longitudinal section view of the cylinder in a later stage of the process of manufacture.

Figure 7 is an end view of the cylinder shown in Figure 6.

Figure 8 is a transverse section view taken on line 8—8 of Figure 6.

Figure 9 is a side elevation of a cylinder showing one stage in the production of the outer race shown in Figure 1.

Figure 10 is an end view of the cylinder shown in Figure 9.

Figure 11 is a transverse section view taken on line 11 of Figure 9.

Figure 12 is a longitudinal section view of the cylinder of Figure 9 shown at a later stage in the process of manufacture.

Figure 13 is an end view of the cylinder shown in Figure 12.

Figure 14 is a transverse section view taken on line 14—14 of Figure 12.

Figure 15 is a longitudinal section view of a slightly modified form of bearing race made in accordance with my invention.

Figure 16 is an end view of the bearing race shown in Figure 15.

Figure 18:
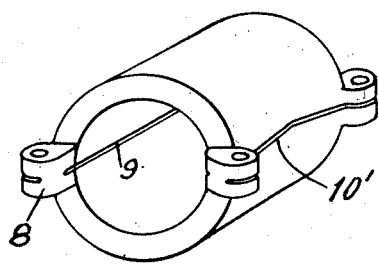
Figure 18 is a perspective view of a cylinder showing one stage in the production of the embodiment of my invention shown in Figure 17.
Figure 17:
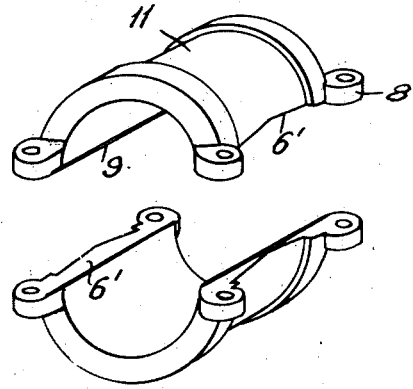
Figure 17 is a perspective view of another embodiment of my invention, the two parts of the race being separated to show the construction.
Figures 19, 20, 22:
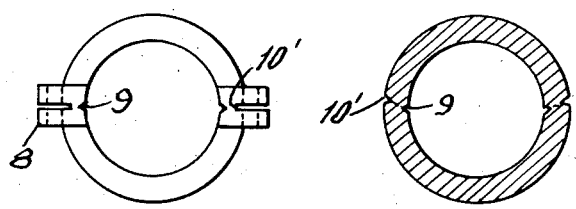
Figure 19 is an end view of the bearing cylinder shown in Figure 18.
Figure 20 is a transverse section taken through the central portion of the cylinder of Figure 19.
Figure 22 is an end view of the bearing race shown in Figure 21.
Figure 21:
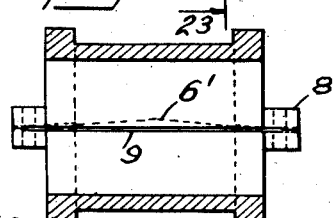
Figure 21 is a longitudinal section view of the bearing race of Figure 18 shown at a later stage in the process of manufacture.
Figure 23:
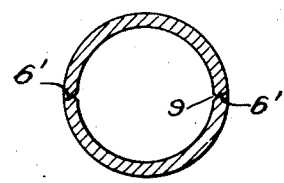
Figure 23 is a transverse section taken on line 23—23 of Fig. 21.

In Figure 1 I have illustrated a shaft 1 such as the crank shaft of an automobile and at 2 I have illustrated a crank such as that employed in an automobile engine, for the purpose of connecting a piston to the crank shaft. My improved bearing is shown interposed between the shaft 1 and the member 2. This bearing comprises an outer race 3, an inner race 4 and a plurality of antifriction members 5′ such as rollers. The outer race 3 is split longitudinally and comprises two bearing sections $3^a$ and $3^b$. These two bearing sections contact with each other across the broken surface 5. The inner bearing race 4 also consists of two bearing sections $4^a$ and $4^b$ contacting with each other across the broken surface 6. The outer race is held firmly in the end of the crank 2 by means of a threaded stud 7 passing through the member 2 and pressing against the outer surface of the race 3. It will be understood that any other suitable method of fixing the outer race with respect to the member 2 may be employed. The two sections of each bearing race are held together by means of bolts passing through lugs disposed at the ends of the race as shown in Figure 2, for example.

The method which I prefer to employ in making the inner bearing race 4 can be clearly understood by referring to Figures 2 to 8, inclusive. In Figure 2 I have illustrated a cylindrical piece of material suitable for making bearing races. This cylinder is provided with four lugs 8 which may or may not be in the same plane. These lugs are arranged at the ends of the cylinder. The lugs shown in Figure 2 are all in the same plane whereas those shown at 8′ in Figures 15 and 16 are not in the same plane. The inner face of the cylinder shown in Figures 2 to 5, inclusive, is provided with a pair of grooves 9 extending lengthwise of the cylinder and arranged substantially parallel to each other on opposite sides of the cylinder. These grooves may lie within the central plane passing through the lugs 8. A pair of grooves 10 are provided on the outside of the cylinder. These grooves also extend lengthwise of the cylinder but portions of them at least extend at an angle to the axis of the cylinder. In Figure 2, I have attempted to illustrate the grooves 10 as extending in substantially spiral form along the external surface of the cylinder. These grooves intersect the lugs 8. The grooves 9 and the corresponding grooves 10 should be arranged and cut to such a depth that the surfaces defined by two adjacent grooves are of less extent than any section through portions of the cylinder between the lugs. This is desirable because it insures the breaking of the cylinder along the grooved lines rather than at some other portion of the cylinder. Care must be taken, however, not to cut the external grooves 10 so deeply as to pass through the bearing surface of the cylinder when the cylinder is machined to its final dimensions. The lugs 8 are provided with openings or passages extending therethrough transversely of the cylinder and adapted to receive bolts whereby the two sections of the cylinder can be clamped together.

Figures 6, 7 and 8 show the bearing cylinder after it has been broken along the grooved portions thereof and after the external surface has been machined to its final dimensions. The broken surfaces are shown at 6 as in Figure 1. The external grooves 10 do not appear in Figures 6 to 8, inclusive, except in the lugs 8 because the machining operation cut down the external surface of the cylinder to a depth greater than that of these grooves. The finished bearing surface 11 is thus continuous and smooth, the two parts of the bearing race fitting together so closely that the joint can scarcely be observed. This two-part race can be assembled on a shaft such as that shown in Figure 1 without any difficulty whatever. This is due to the fact that the inner edges of the broken surfaces are substantially parallel to the axis of the shaft. There is no danger of any of the anti-friction rollers 5 making contact with the joint throughout the length thereof because the exposed edge of this joint extends at an angle to the line of contact between any of the rollers and the inner race. Accordingly, there is no danger of the bearing race wearing to a greater extent in the immediate vicinity of the joint than at any other portion of the race.

I am aware that others have attempted to make a bearing race for roller bearings, having the joint extending at an angle to the line of contact between any of the rollers and the race. The difficulties involved in machining the abutting surfaces of such a race and assembling the race on a shaft so that the surfaces will fit together exactly are of such magnitude that this type of race is not practical. By employing the present invention, it is possible to make such a race without taking any extra precautions during the machining operations because there is no danger of the adjoining surfaces of the two bearing sections not fitting each other exactly when the race is assembled on the shaft. Accordingly, it is possible to make the improved race in large quantities at very low cost.

In Figures 10 to 14, I have illustrated the outer bearing race 3 in various stages of its manufacture. Figure 10 shows a cylinder provided with a pair of grooves 12 on the inner face thereof. These grooves preferably extend at an angle to the axis of the cylinder so that when the bearing is assembled, the rollers will not make contact with the inner edges of the joints throughout the length thereof. These grooves may extend in substantially spiral form as shown in Figure 9. Lugs 13 may be provided at the ends of the cylinder as described in connection with the bearing race of Figures 2 to 8, inclusive. The outer surface of the cylinder is provided with a pair of grooves 14 extending lengthwise of the cylinder and formed in such a manner that the section or surface defined by one of the outer grooves and the corresponding inner groove 12 is of less extent than any section through the adjacent portion of the cylinder wall. The outer grooves 12 may extend substantially parallel to the axis of the cylinder or they may extend at an angle thereto. After the cylinder is formed, the inner surface may be turned to the desired diameter and when this is accomplished, the inner grooves 12 will have disappeared. The smooth machined inner surface of the cylinder is shown at 15 in Figures 12, 13 and 14 and the broken surfaces are shown at 5. The two parts of the cylinder can be clamped together by inserting bolts through openings or holes in the lugs 13 as will be clearly understood by referring to the drawings.

In Figures 17 to 23, inclusive, I have shown a form of inner bearing race identical with that shown in Figures 2 to 8, inclusive, except that the outer grooves 10' and consequently the outer edges of the joint in the finished race do not extend throughout the length of the cylinder in spiral form. All other parts of this race are identical with the corresponding parts shown in Figures 2 to 8, inclusive, and bear the same reference numerals. The grooves 10' may be considered as extending in spiral form from each end of the cylinder to the center thereof. Where this feature is employed, the ends of the inner grooves 9 and the ends of the corresponding outer grooves 10' lie in the same plane. Accordingly, the lugs 8 may be made of smaller dimensions than the corresponding lugs of the race shown in Figures 2 to 8, inclusive. The broken surfaces of the race shown in Figures 17 to 23, inclusive, have the irregular configuration shown at 6' in Figure 17.

As a further improvement of this type of bearing I may machine away certain portions of the races adjacent to the divisions on the affixing surfaces as shown in dotted lines at A and A' in Figure 1. The purpose of this is to enable the races to yield slightly away from the rolling elements and thus substantially decrease the load on the races at the divisions. This improvement has the distinct advantage that under no circumstance will the balls lose contact with the races, although the races yield the necessary amount even with a varying load, to afford the desired compression relief on the races at the joints.

Figure 24:
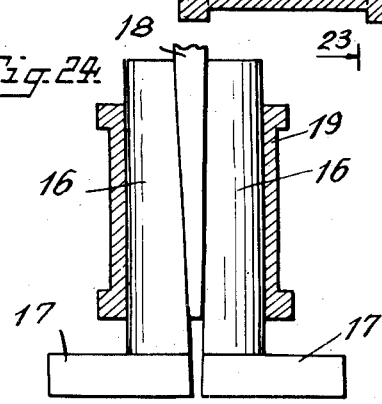
Figure 24 is an elevation of a device for breaking the bearing race.
Figure 25:
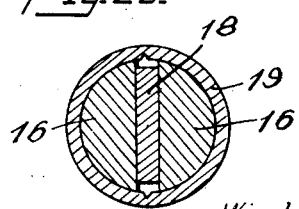
Figure 25 is a transverse section of the device shown in Figure 24.

I prefer to make my improved bearing races by scoring the cylinders with grooves of the form above described and then applying force to the inside of the cylinder throughout substantially the entire surface thereof so as to break the cylinders along the grooved lines. An expansion device particularly suited to this purpose is shown in Figures 24 and 25. This device may consist of two members 16 having external cylindrical surfaces with a radius of curvature substantially equal to that of the inner surface of the bearing cylinder. These two members may each be provided with a base portion 17 forming a support for holding the member in an upright position. These members are preferably provided with inner surfaces inclined at an angle to the axis of the cylinder formed by these two members when they are placed close together as shown in Figure 24. A wedge 18 is provided as a means for forcing the two members 16 apart.

In using the expansion device of Figures 24 and 25, the two members 16 are placed close together with their inclined faces opposite each other. The bearing cylinder to be broken is then slipped over the outer ends of the member 16 and the wedge 18 is forced between the two members 16 until the outer surfaces thereof firmly engage the inner face of the bearing cylinder shown at 19 in Figures 24 and 25. The cylinder 19 should be placed so that the grooved portions thereof are substantially in line with the wedge 18 so that when the wedge is given a sharp blow, the cylinder will break along the grooves.

The method of breaking the cylinder, described in the preceding paragraph has been found to be very satisfactory. Force is applied to the cylinder in such a manner that there is no tendency to distort the two sections of the race during the breaking operation. The outer surfaces of the members 16 of the expansion device exactly fit the inner surface of the bearing cylinder and as a result, the only stress of any great magnitude developed in the cylinder is tensile stress acting across the surfaces or sections defined by the grooves.

It is to be understood that my invention is not confined to the particular embodiments illustrated and described but include such modifications thereof as fall within the scope of the appended claims.

I claim:

1. A bearing race comprising a longitudinally divided sleeve having a bearing surface, the said sleeve having the two parts thereof contacting with each other across a broken surface extending throughout the length of the sleeve in such a manner that at least part of an edge of this broken surface, contiguous with the bearing surface, is inclined at an angle to any plane containing the axis of the race, so that the edges of the broken surface, remote from the bearing surface, are substantially parallel to the axis of the race.

2. In a bearing, the combination of a shaft, and a longitudinally divided sleeve fitted to said shaft and having the two parts thereof contacting with each other across a broken surface having the inner edges thereof substantially parallel to the shaft and the outer edges thereof inclined at an angle to any plane containing the axis of a shaft.

3. A bearing comprising the combination of two longitudinally divided sleeves having bearing surfaces and forming inner and outer races, and a plurality of rollers arranged between the races, each of the two races having the two parts thereof contacting with each other across a broken surface having the edge thereof, contiguous with the bearing surface of this race, inclined at an angle to the line of contact between any of the rollers and this bearing surface, and the inner edges of the broken surface of the inner race being substantially parallel to the axis of this race.

4. A bearing comprising the combination of two longitudinally divided sleeves having bearing surfaces and forming inner and outer races, and a plurality of rollers arranged between the races, each of the two races having the two parts thereof contacting with each other across a broken surface having the edge thereof, contiguous with the bearing surface of this race, inclined at an angle to the line of contact between any of the rollers and this bearing surface, the inner edges of the broken surface of the inner race being substantially parallel to the axis of this race, and the said sleeves being provided with lugs facing each other across the broken surfaces at the ends of the sleeves, whereby the two parts of each sleeve can be clamped together.

5. A bearing race comprising a longitudinally divided sleeve having a bearing surface, the said sleeve having the two parts thereof contacting with each other across a broken surface extending throughout the length of the sleeve in such manner that one edge of this broken surface, contiguous with the bearing surface, forms a partial spiral about the axis of the race and the other edge, remote from the bearing surface, forms a straight line parallel to the axis of the race.

6. A bearing race comprising two longitudinal segments contacting with each other along a broken surface and presenting a cylindrical bearing surface and a surface adapted to be fixed to a suitable mounting, this latter surface being cut away in the vicinity of the broken edges to permit expansion of this portion of the race substantially as described.

7. A bearing race comprising a longitudinally divided sleeve having a bearing surface, the said sleeve having the two parts thereof contacting with each other across a surface extending the length of the sleeve in such a manner that at least portions of the edges of this surface, contiguous with the bearing surface, are inclined at an angle to any plane containing the axis of the race, and at least portions of the other edges of this surface, remote from the bearing surface, are substantially parallel to the axis of the race.

In testimony whereof I affix my signature.

WINSLOW S. PIERCE, Jr.